United States Patent
Cai et al.

(10) Patent No.: US 9,210,652 B2
(45) Date of Patent: Dec. 8, 2015

(54) SYSTEM AND METHOD FOR ACTIVE SCANNING IN MULTI-CHANNEL WI-FI SYSTEM

(71) Applicant: FutureWei Technologies, Inc., Plano, TX (US)

(72) Inventors: Lin Cai, Schaumburg, IL (US); Bin Chen, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 118 days.

(21) Appl. No.: 13/936,054

(22) Filed: Jul. 5, 2013

(65) Prior Publication Data
US 2014/0010089 A1    Jan. 9, 2014

Related U.S. Application Data
(60) Provisional application No. 61/668,942, filed on Jul. 6, 2012.

(51) Int. Cl.
| | |
|---|---|
| H04W 4/00 | (2009.01) |
| H04W 48/16 | (2009.01) |
| H04W 28/04 | (2009.01) |
| H04W 84/12 | (2009.01) |

(52) U.S. Cl.
CPC .............. H04W 48/16 (2013.01); *H04W 28/04* (2013.01); *H04W 84/12* (2013.01)

(58) Field of Classification Search
USPC .............. 370/329, 311, 328, 338, 310.2, 330, 370/331, 347, 349, 447
See application file for complete search history.

(56) References Cited

U.S. PATENT DOCUMENTS

| | | | |
|---|---|---|---|
| 2006/0111103 A1* | 5/2006 | Jeong et al. | ................. 455/434 |
| 2006/0159041 A1 | 7/2006 | Zhun | |
| 2008/0056211 A1* | 3/2008 | Kim et al. | ................. 370/338 |
| 2009/0207758 A1 | 8/2009 | Jeong et al. | |
| 2011/0243013 A1 | 10/2011 | Lee et al. | |

FOREIGN PATENT DOCUMENTS

| | | |
|---|---|---|
| CN | 1823501 A | 8/2006 |
| CN | 101848528 A | 9/2010 |

OTHER PUBLICATIONS

Zhang U.S. Appl. No. 61/668,285, filed Jul. 5, 2012.*

(Continued)

*Primary Examiner* — Phuongchau Ba Nguyen
(74) *Attorney, Agent, or Firm* — Slater & Matsil, L.L.P.

(57) ABSTRACT

It is possible to shorten channel monitoring periods of unoccupied channels during Wi-Fi discovery by verifying whether or not a message indicating the presence of a Wi-Fi AP has been detected prior to the probe timer reaching a medium channel time (MedChannelTime). For example, STAs detecting some channel activity during the clear channel assessment may nevertheless discontinue monitoring a Wi-Fi Channel when no messages indicating the presence of a Wi-Fi AP are detected prior to expiration of the MedChannelTime. Messages indicating the presence of a Wi-Fi AP may include any Wi-Fi messages sent from or destined for a Wi-Fi AP, while excluding probe requests and non-Wi-Fi messages.

21 Claims, 4 Drawing Sheets

(56) References Cited

OTHER PUBLICATIONS

"IEEE Standard for Information technology—Telecommunications and information exchange between systems Local and metropolitan area networks—Specific requirements Part 11: Wireless LAN Medium Access Control (Mac) and Physical Layer (Phy) Specifications," IEEE Std P802.11™-D12, Nov. 2011, IEEE Computer Society, 2910 pages.

International Search Report received in Application No. PCT/CN2013/078989, mailed Oct. 17, 2013, 10 pages.

Cai, Lin, "ProbeTImer of Active Scanning," IEEE 802.11-12/0788r0, Jul. 5, 2012, 12 pages.

Cai, Lin et al., "Setting of ProbeTimer," IEEE 802.11-12/0034r1, Jan. 2, 2013, 14 pages.

Extended European Search Report received in Application No. 13813077.8-1854, mailed Jun. 25, 2015, 9 pages.

Ryu, Kiseon, et al., "Probe Response Broadcasting," IEEE 802.11-12/0550r1, May 14, 2012, 12 pages.

Speicher, Sebastian, et al., "Fast MAC-Layer Scanning in IEEE 802.11 Fixed Relay Radio Access Networks," Proceedings of the International Conference on Networking, International Conference on Systems and International Conference on Mobile Communications and Learning Technologies, Apr. 2006, 8 pages.

* cited by examiner

SYSTEM AND METHOD FOR ACTIVE SCANNING IN MULTI-CHANNEL WI-FI SYSTEM

This application claims the benefit of U.S. Provisional Application No. 61/668,942 filed on Jul. 6, 2012, entitled "System and Method for Active Scanning in a Multi-Channel WiFi System," which is incorporated herein by reference as if reproduced in its entirety.

TECHNICAL FIELD

The present invention relates to a system and method for wireless communications, and, in particular embodiments, to a system and method for providing efficient active scanning in a Multi-Channel Wi-Fi system.

BACKGROUND

Many wireless access networks are configured to operate as wireless local area networks (WLANs) in accordance with the Institute of Electrical and Electronics Engineers (IEEE) standard publication 802.11-2012, which is incorporated herein as if reproduced in its entirety. Mobile stations access WLANs by establishing a wireless link/connection with a wireless fidelity (Wi-Fi) access point (AP) in accordance with a Wi-Fi link setup procedure, which typically requires the mobile station to discover the Wi-Fi AP using a passive or active scanning technique.

When using passive scanning techniques, a mobile station will typically listen for broadcast messages (e.g., beacons, etc.) that are periodically transmitted by Wi-Fi APs. However, the relatively long periodic intervals between consecutive broadcasts (e.g., 100 milliseconds (ms) or more) may render passive scanning unsuitable for discovery situations requiring fast link setup, such as handovers. To achieve faster link setup, mobile stations may rely on active scanning techniques, which typically require the mobile station to transmit a probe request message over a Wi-Fi channel, and subsequently monitor the Wi-Fi channel for a probe response message sent by a Wi-Fi AP. If a probe response is detected, the mobile station discovers the Wi-Fi AP on that channel. If a probe response is not detected, then the mobile station will determine that the channel is unoccupied (e.g., not being served by a Wi-Fi AP), and proceed to scan the next channel.

SUMMARY

Technical advantages are generally achieved, by embodiments of this disclosure which describe systems and methods for providing efficient active scanning in a Multi-Channel Wi-Fi network.

In accordance with an embodiment, a method for actively scanning a Wi-Fi network is provided. In this example, the method comprises sending a probe request message over a first channel in a multi-channel wireless local area network (WLAN), monitoring the first channel for a probe response, setting a probe timer, and detecting at least some channel activity prior to the probe timer reaching a minimum channel time (MinChannelTime). The method further includes discontinue monitoring of the first channel when the probe timer reaches a medium channel time (MedChannelTime) unless a message indicating the presence of a Wi-Fi access point (AP) is detected on the first channel prior to the probe timer reaching the MedChannelTime. The method further includes monitoring the first channel until the probe timer reaches a maximum channel time (MaxChannelTime) when at least one message indicating the presence of a Wi-Fi AP is detected on the first channel prior to expiration of the MedChannelTime. An Apparatus for performing this method is also provided.

In accordance with another embodiment, a method for actively scanning a Wi-Fi network is provided. In this example, the method includes sending a probe request over a channel in a multi-channel wireless local area network (WLAN), starting a probe timer, detecting a physical channel clear channel assessment indication (PHY-CCA.indication) (busy) primitive before the probe timer reaches a minimal channel time (MinChannelTime). The method further includes setting a network allocation vector (NAV) to zero and scanning a next channel in the multi-channel WLAN if all frames detected before the probe timer reaches the MinChannelTime are probe request frames. The method further includes monitoring the channel for probe response messages until the probe timer reaches a maximum channel time (MaxChannelTime) if at least one frame that is not a probe request frame is detected before the probe timer reaches the MinChannelTime.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
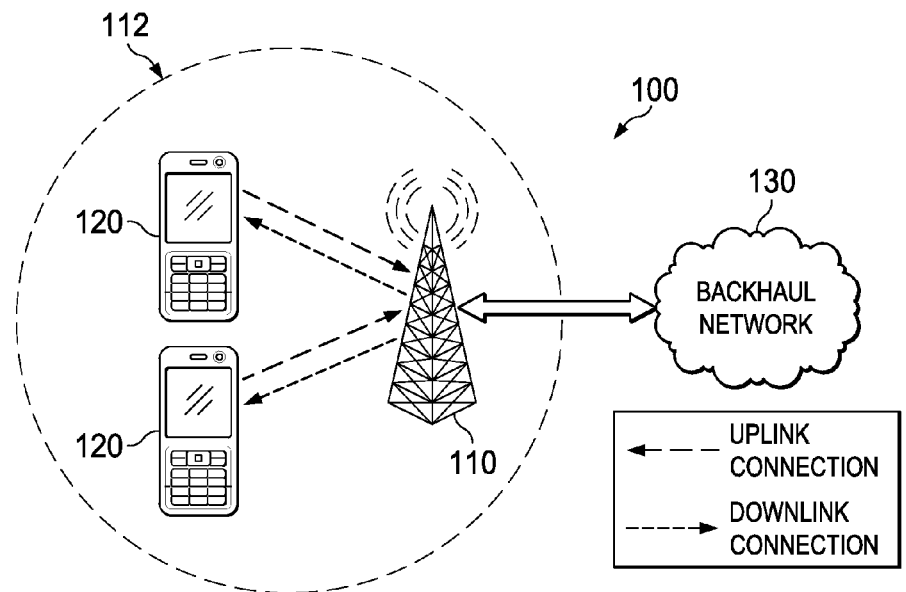
FIG. 1 illustrates a diagram of a network for communicating data.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. As discussed herein, the term station (STA) may refer to any Wi-Fi enabled device, including mobile stations, base stations, small-cell access points (e.g., femtocells, picocells, etc.), relays, etc.

While active scanning typically achieves faster link setup than passive scanning, conventional active scanning techniques may nevertheless experience significant delays in noisy network environments. More specifically, STAs utilizing conventional active scanning techniques will typically perform a clear channel assessment (CCA) to determine whether channel activity is present on a given Wi-Fi channel. The active scanning is typically performed by sending a probe request over a given Wi-Fi channel and then monitoring the channel for a minimum channel time (MinChannelTime). If channel activity is not detected prior to expiration of the MinChannelTime, then the STA stops monitoring the current channel and proceeds to scan the next channel. On the other hand, if channel activity is detected, then the STA continues to monitor the channel until a maximum channel time (MaxChannelTime) has expired. Accordingly, conventional active scanning techniques require the STA to monitor a given channel for either a MinChannelTime or MaxChannelTime depending on whether the STA detects channel activity via clear channel assessment.

One shortcoming of this conventional approach is that STAs often detect channel activity on unoccupied Wi-Fi channels during noisy or crowded network environments. More specifically, Wi-Fi channels span unlicensed frequency spectrums and, as a result, STAs may detect non-Wi-Fi interference (e.g., microwave radiation, device-to-device (D2D) communications, etc.). In addition, STAs may detect probe requests from other STAs when performing clear channel assessments. Conventionally, when a STA detects channel activity arising from non-Wi-Fi signals or probe requests when performing CCA, the STA will stay in the scanned channel for MaxChannelTime, even if there is no operating AP in that channel. Accordingly, techniques and mechanisms for reducing monitoring periods of unoccupied channels during active scanning are desired.

Aspects of this disclosure abbreviate/shorten channel monitoring periods when channel activity is detected during the clear channel assessment but there is no direct evidence of the presence of a Wi-Fi AP on the channel prior to a medium channel time (MedChannelTime). More specifically, STAs detecting some channel activity during the MinChannelTime interval (e.g., CCA busy primitive) may discontinue monitoring of the Wi-Fi Channel when no messages indicating the presence of a Wi-Fi AP are detected prior to expiration of the MedChannelTime. Hence, the MedChannelTime represents somewhat of an intermediate checkpoint in which the STA makes a more detailed assessment as to the likelihood of an AP on the channel, thereby allowing for the channel monitoring period to be abbreviated if the channel appears to be unoccupied (albeit, potentially noisy). Messages indicating the presence of a Wi-Fi AP may include any Wi-Fi message/frame sent from or destined for a Wi-Fi AP, such as data frames (e.g., downlink frames, uplink frames, etc.), management frames (e.g., association messages, authentication messages, etc.), control frames (e.g., request to send (RTS), clear to send (CTS), acknowledgment (ACKs), etc.), and others. However, messages indicating the presence of a Wi-Fi AP may typically exclude generic Wi-Fi discovery messages transmitted by mobile stations (e.g., probe request message, etc.) as well as non-Wi-Fi signals (e.g., D2D messages, and other messages peer-to-peer transmitted by mesh stations operating in an independent basic service set (IBSS) mode).

FIG. 1 illustrates a network 100 for communicating data. The network 100 comprises an access point (AP) 110 having a coverage area 112, a plurality of mobile stations 120, and a backhaul network 130. The AP 110 may comprise any component capable of providing wireless access by, inter alia, establishing uplink (dashed line) and/or downlink (dotted line) connections with the mobile stations 120, such as a base station, an enhanced base station (eNB), a femtocell, and other wirelessly enabled devices. The mobile stations 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
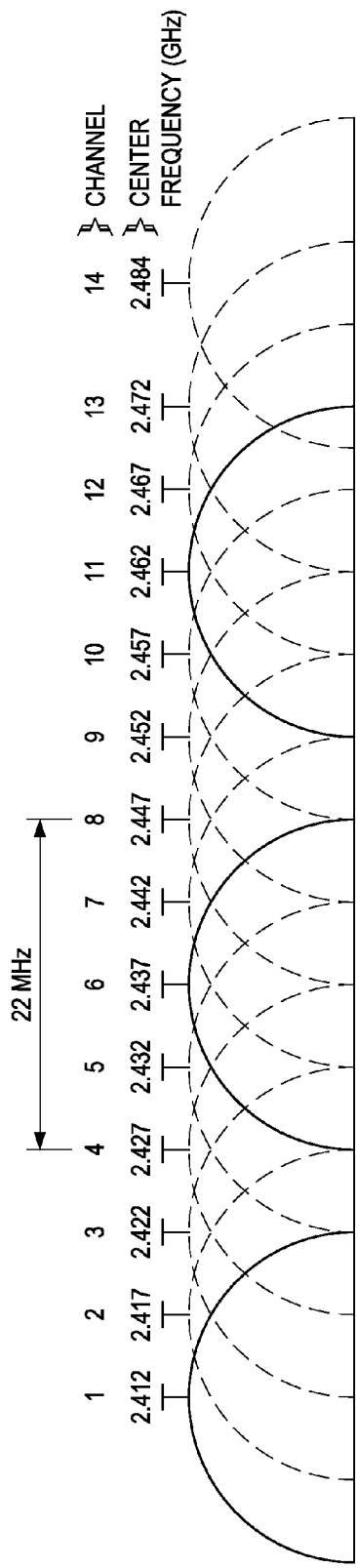
FIG. 2 illustrates a diagram of a set of Wi-Fi channels in a wireless network.
Figure 3:
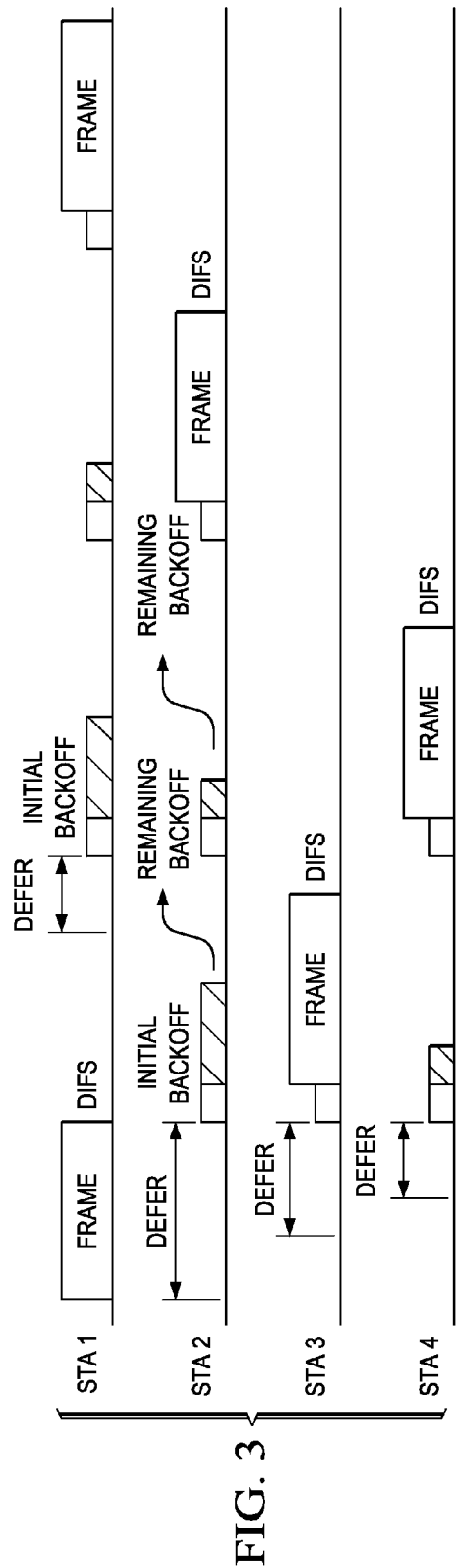
FIG. 3 illustrates a diagram of a channel access procedure.

FIG. 2 illustrates a set of Wi-Fi channels in a 2.4 gigahertz (GHz) frequency band of a wireless network. As shown, each of the channels comprises a 22 megahertz bandwidth (MHz) bandwidth. Various sub-sets of channels may be orthogonal such that they do not overlap with each other. By way of example, channels one, six, and eleven may be orthogonal with one another. The set of Wi-Fi channels may be shared by multiple stations, which may coordinate their access using a distributed channel access function, such as a distributed coordination function (DCF) based on carrier sense multiple access with collision avoidance (CSMA/CA). Distributed channel access functions (e.g., DCF, etc.) may use both physical and virtual carrier sense functions to determine the state of the medium. In one example, a physical carrier sense resides in the physical (PHY) and uses energy detection and preamble detection to determine whether the medium is busy, while a virtual carrier sense resides in the media access control (MAC) and uses reservation information carried in the Duration field of the MAC header to identify whether the medium is busy. The virtual carrier sense mechanism may be referred to as the network allocation vector (NAV). Typically, the wireless channel may be determined to be idle when both the physical and virtual carrier sense mechanisms indicate such. In an embodiment, a station with a data frame for transmission first performs a clear channel assessment (CCA) by sensing the wireless channel for a fixed duration, e.g., the DCF inter-frame space (DIFS). If the wireless channel is busy, the station waits until the channel becomes idle for a DIFS, and then waits for a further random backoff period. The backoff timer decreases by one for every idle slot and freezes when the channel is sensed busy. When the backoff timer reaches zero, the station starts data transmission. The channel access procedure is shown in FIG. 3.

Fast link setup is beneficial in so far as it improves delay performance and reduces power consumption in mobile devices. One factor affecting fast link setup is the time required for AP discovery when using active scanning. To reduce active scanning time, STAs perform a clear channel assessment, during which the channel is sensed as either idle (PHY-CCA.indication=0) or busy (PHY-CCA.indication=1). In some implementations, the mobile station will either detect, or not detect, a physical channel CCA busy primitive (PHY-CCA.indication (busy) primitive) during the CCA. If the PHY-CCA.indication (busy) primitive is not detected prior to the probing time reaching a MinChannelTime, then the STA will switch to another channel and initiate another probing procedure until all channels are sensed or a Wi-Fi AP is discovered. If the channel is sensed busy, the STA will wait for a duration of MaxChannelTime until it switches to another channel when no AP is discovered. Wi-Fi networks are often multi-channel systems, and STAs may need to probe each channel until it discovers an AP and associates with it successfully. The overall discovery delay includes the probing time of STAs in each channel, with larger delays resulting when a STA monitors unoccupied channels for longer periods.

Clear channel assessments may be based on energy detection techniques. When the detected energy during a certain duration is larger than a threshold, then the STA may detect channel activity (e.g., PHY-CCA.indication=1). Wi-Fi systems may support large numbers of STAs. One objective of future Wi-Fi systems may be to achieve a delay of one second for 100 STAs to successfully associate with Wi-Fi APs, which is about a 100 millisecond (ms) association delay for a given STA. However, when multiple STAs perform active scanning and transmit their probe requests, it becomes more likely that any given STA will detect a busy channel due to probe requests of other STAs. In addition, Wi-Fi systems operate in unlicensed spectrum bands, e.g., 2.4 GHz, 5 GHz, etc., and Wi-Fi STAs may experience interference from other neighboring devices such as microwave, cordless phone, etc. Under conventional active scanning schemes, STAs detecting a busy channel caused by probe requests (or non-Wi-Fi interference) may have to monitor an unoccupied channel until a maximum channel time (MaxChannelTime) expires, which may unnecessarily delay AP discovery.

Two probe timers are defined for AP/network discovery over multiple channels, namely MinChannelTime and MaxChannelTime. STAs switch to another channel for AP discovery after MinChannelTime is reached when there is no detected energy in this channel. Otherwise, they will scan the current channel till MaxChannelTime is reached when some energy is detected before MinChannelTime expires. However, energy detection is a coarse solution in unlicensed Wi-Fi frequency spectrums. Signals from non-Wi-Fi devices or probing messages from Wi-Fi devices may cause the STAs to wait for a long MaxChannelTime even when there is no AP/network in this channel. Aspects of this disclosure propose a medium channel time (MedChannelTime), which is larger than or equal to MinChannelTime, but smaller than or equal to MaxChannelTime. This may reduce the scanning time of STAs in each channel when there is no hard evidence that there exist an AP/network.

Figure 4:
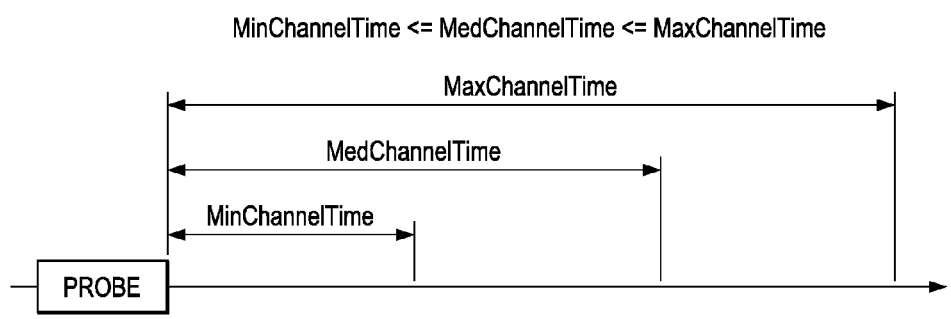
FIG. 4 illustrates a diagram of a set of embodiment probe channel time response thresholds.

FIG. 4 illustrates a third probe timer, which is an intermediate timer that is larger than or equal to MinChannelTime, but smaller than or equal to MaxChannelTime. The third timer may strike a balance between high AP discovery probability and low scanning delay. Based on the information STAs observe/receive on the channel, STAs may decide the time duration it should spend on each channel. For example, during scanning, a STA overhears a data packet transmission of other STAs or an AP, which implies the existence of a Wi-Fi network with an operating AP, the STA will set the network allocation vector (NAV) accordingly. The STA may stay in the channel until MaxChannelTime expires as it is relatively likely that the STA may discover an AP on the channel. In other words, a non-zero NAV value may imply the existence of a Wi-Fi AP, and thus the STA may continue to monitor the channel until the MaxChannelTime expires. In some embodiments, a STA that overhears some management frames and control frames communicated from or to an AP may not necessarily set the NAV and wait until MaxChannelTime expires. In the case that a PHY-CCA.indication (busy) primitive is not detected, a STA may switch to the next channel after MinChannelTime expires. It is also possible that PHY-CCA.indication is detected but there is no hard evidence of the AP's existence as CCA is based on the energy detection technique which can be invoked by other probe requests from neighboring STAs or other non-Wi-Fi interferers such as microwave or cordless phone, etc. Thus, when only PHY-CCA.indication (busy) primitive is detected, STAs elect not to wait for a MaxChannelTime, but it can use another timer MedChannelTime such that MinChannelTime<=MedChannelTime<=MaxChannelTime. In some embodiments, the MedChannelTime is equal to MinChannelTime, which implies that a STA can choose to switch channels upon expiration of the MinChannelTime before switching to other channels if it finds no hard evidence of an AP's presence. In other words, when some energy is detected but there is no hard evidence of an AP, a STA can switch to another channel when a shorter timer of MedChannelTime expires and no AP/network is detected yet.

Notably, the NAV may not be the only parameter carrying or indicating implicit AP/network information. Many other frames may implicitly include the information of AP's existence. For example, some management frames (e.g., probe responses, association responses, timing advertisements, authentication messages, de-authentication messages, etc.,) are transmitted by, or addressed to, an AP. Although these frames may not, in some embodiments, provide sufficient information for STAs to discover the AP, they may at least indicate the presence of an AP on the channel. Some other frames may serve a similar purpose, such as data frames and control frames, e.g., request to send (RTS), clear to send (CTS), acknowledgment (ACKs), negative acknowledgement (NACKs), contention free end (CF-end), etc. If frames having implicit AP information (e.g., data, control, management, etc.) are detected, then STAs may set the probe timer to MaxChannelTime. If no frames having implicit AP information are detected, STAs can switch to another channel after MedChannelTime expires.

Figure 5:
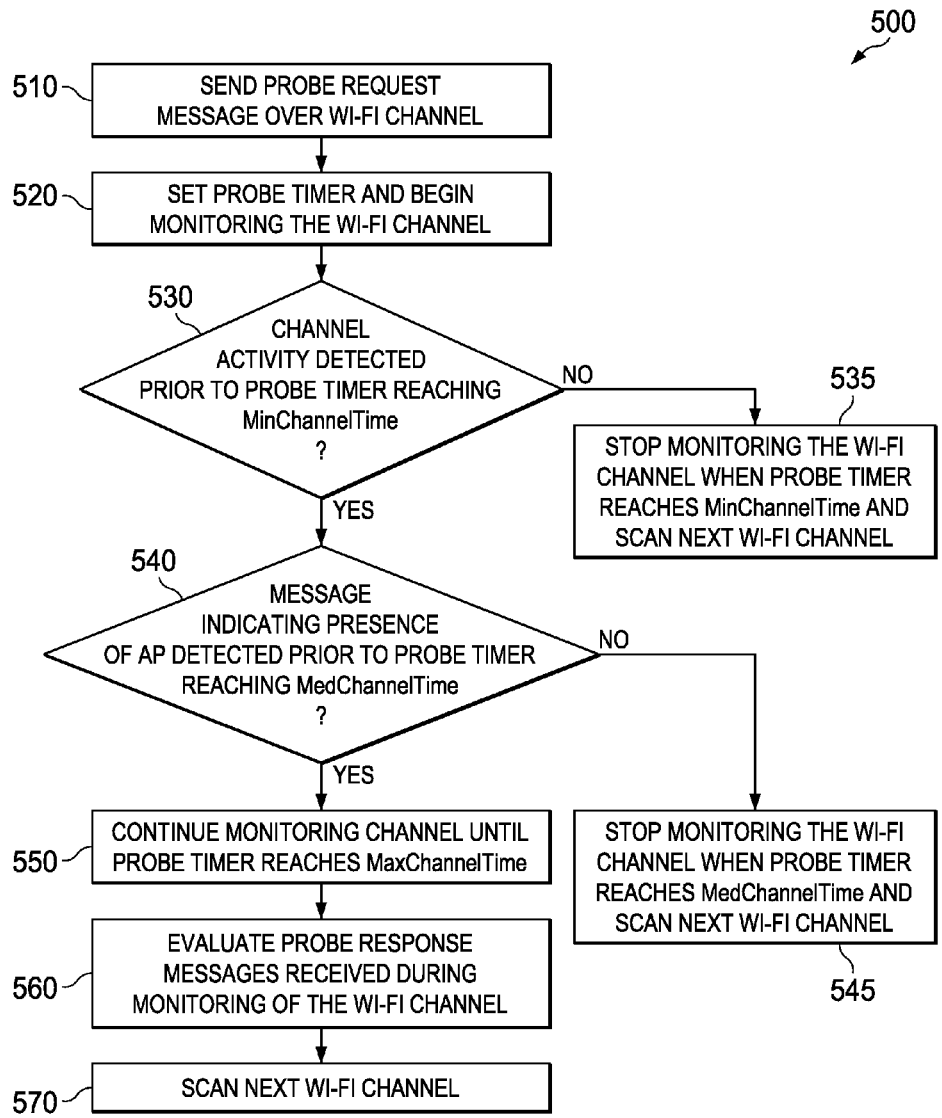
FIG. 5 illustrates a diagram of an embodiment method for performing active scanning during AP discovery.

FIG. 5 illustrates an embodiment method 500 for active scanning during AP discovery, as might be performed by a station. As shown, the method 500 begins with step 510, where the station sends a probe request message over a Wi-Fi channel. Next, the method 500 proceeds to step 520, where the station sets a probe timer and begins monitoring the Wi-Fi channel. Thereafter, the method 500 proceeds to step 530, where the station determines whether or not channel activity was detected prior to the probe timer reaching MinChannelTime. If not, the method 500 proceeds to step 535, where the station stops monitoring the Wi-Fi channel and proceeds to scan the next channel. On the other hand, if channel activity was detected prior to the probe timer reaching MinChannelTime, then the method 500 proceeds to step 540, where the station determines whether a message indicating the presence of an AP is detected prior to the probe timer reaching a MedChannelTime. If not, the method 500 proceeds to step 545, where the station stops monitoring the Wi-Fi channel and proceeds to begin scanning the next channel. If a message indicating the presence of an AP was detected prior to the probe timer reaching a MedChannelTime, then the method 500 proceeds to step 550, where the station continues monitoring the Wi-Fi channel until the probe timer reaches a MaxChannelTime. Thereafter, the method 500 proceeds to step 560, where the station evaluates any probe response messages received while monitoring the Wi-Fi channel. In this step, the station may determine whether a Wi-Fi AP is present on the channel, and if so, what steps are needed to effectuate an association with that Wi-Fi AP. Finally, the method 500 proceeds to step 570, where the station (optionally) begins scanning the next Wi-Fi channel. In some embodiments, the station will simply establish a link with a discovered Wi-Fi Channel, in which case it may elect not to scan additional channels.

The following comprises an embodiment logic flow for configuring STAs to perform active scanning in accordance with aspects described herein. If PHY-CCA.indication (busy) primitive has not been detected before the Probe Timer reaches MinChannelTime, then set NAV to 0 and scan the next channel. If PHY-CCA.indication (busy) primitive has been detected and all frames detected before the Probe Timer reaches MedChannelTime (or MinChannelTime) are Probe Request frames and/or peer-to-peer messages (e.g., transmissions between mesh STAs in an Independent Basic Service Set (IBSS)), then set NAV to 0 and scan the next channel. Otherwise, while the Probe Timer is less than the MaxChannelTime, process any received probe responses and any received beacons, measurement pilots and fast initial link setup (FILS) discovery frames.

Figure 6:
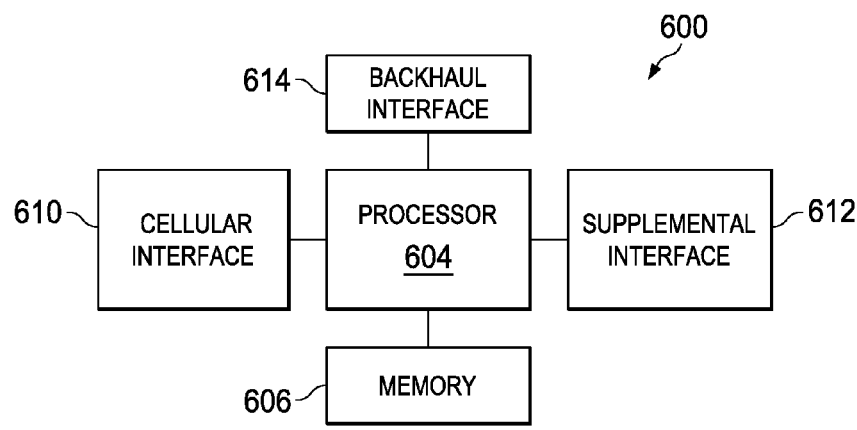
FIG. 6 illustrates a block diagram of an embodiment of a communications device.

FIG. 6 illustrates a block diagram of an embodiment of a communications device 600, which may be equivalent to one or more devices (e.g., UEs, NBs, etc.) discussed above. The communications device 600 may include a processor 604, a memory 606, a cellular interface 610, a supplemental interface 612, and a backhaul interface 614, which may (or may not) be arranged as shown in FIG. 6. The processor 604 may be any component capable of performing computations and/or other processing related tasks, and the memory 606 may be any component capable of storing programming and/or instructions for the processor 604. The cellular interface 610 may be any component or collection of components that allows the communications device 600 to communicate using a cellular signal, and may be used to receive and/or transmit information over a cellular connection of a cellular network. The supplemental interface 612 may be any component or collection of components that allows the communications device 600 to communicate data or control information via a supplemental protocol. For instance, the supplemental interface 612 may be a non-cellular wireless interface for communicating in accordance with a Wireless-Fidelity (Wi-Fi) or Bluetooth protocol. Alternatively, the supplemental interface 612 may be a wireline interface. The backhaul interface 614 may be optionally included in the communications device 600, and may comprise any component or collection of components that allows the communications device 600 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

Figure 7:
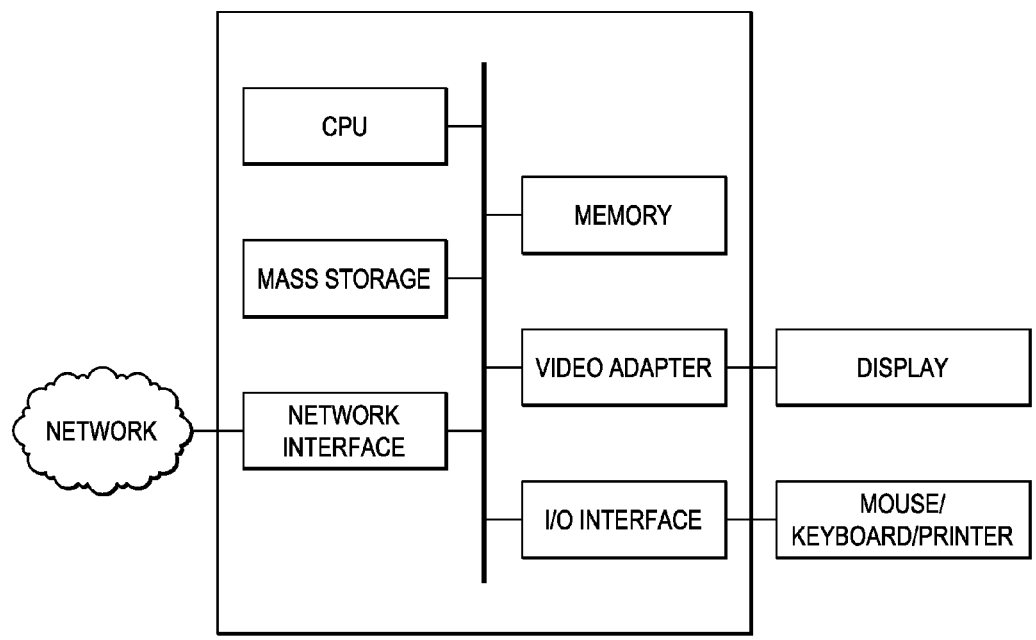
FIG. 7 illustrates a block diagram of an embodiment processing system.

FIG. 7 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for actively scanning a Wi-Fi network, the method comprising:
sending, by a station (STA), a probe request message over a first channel in a multi-channel wireless local area network (WLAN);
monitoring, by the STA, the first channel for probe response messages;
setting, by the STA, a probe timer;
detecting, by the STA, at least some channel activity prior to the probe timer reaching a minimum channel time (MinChannelTime);
discontinue monitoring, by the STA, of the first channel when the probe timer reaches a medium channel time (MedChannelTime) unless a message indicating the presence of a Wi-Fi access point (AP) is detected on the first channel after sending the probe request message and prior to the probe timer reaching the MedChannelTime; and
monitoring, by the STA, the first channel until the probe timer reaches a maximum channel time (MaxChannelTime) when at least one message indicating the presence of a Wi-Fi AP is detected on the first channel after sending the probe request message and prior to the probe timer reaching the MedChannelTime, wherein the MedChannelTime is in-between the MinChannelTime and the MaxChannelTime.

2. The method of claim 1, wherein the MedChannelTime is longer than or equal to the MinChannelTime but shorter than the MaxChannelTime.

3. The method of claim 1, wherein messages indicating the presence of a Wi-Fi AP include Wi-Fi data frames and Wi-Fi control frames.

4. The method of claim 3, wherein messages indicating the presence of a Wi-Fi AP include Wi-Fi management frames that are not Wi-Fi probe requests.

5. The method of claim 3, wherein messages indicating the presence of a Wi-Fi AP exclude probe request messages transmitted by mobile stations.

6. The method of claim 3, wherein messages indicating the presence of a Wi-Fi AP exclude messages transmitted by stations operating in an independent basic service set (IBSS) mode.

7. The method of claim 3, wherein messages indicating the presence of a Wi-Fi AP exclude device-to-device (D2D) messages.

8. The method of claim 1, wherein detecting at least some channel activity prior to expiration of the MinChannelTime comprises:
detecting a physical channel clear channel assessment (PHY-CCA) indication (busy) primitive prior to the probe timer reaching the MinChannelTime.

9. The method of claim 1, wherein the STA is a mobile station.

10. The method of claim 1, wherein the STA is an access point.

11. A station (STA) comprising:
a processor; and
a non-transitory computer readable storage medium storing programming for execution by the processor, the programming including instructions to:
send a probe request message over a first channel in a multi-channel wireless local area network (WLAN);
monitor the first channel for probe response messages;
set a probe timer;
detect at least some channel activity prior to the probe timer reaching a minimum channel time (MinChannelTime);
cease monitoring the first channel when the probe timer reaches a medium channel time (MedChannelTime) unless a message indicating the presence of a Wi-Fi access point (AP) is detected on the first channel after sending the probe request message and prior to the probe timer reaching the MedChannelTime; and
monitor the first channel until the probe timer reaches a maximum channel time (MaxChannelTime) if at least one message indicating the presence of a Wi-Fi AP is detected on the first channel after sending the probe request message and prior to the probe timer reaching of the MedChannelTime, wherein the MedChannelTime is in-between the MinChannelTime and the MaxChannelTime.

12. The STA of claim 11, wherein the MedChannelTime is longer than or equal to the MinChannelTime but shorter than the MaxChannelTime.

13. The STA of claim 11, wherein messages indicating the presence of a Wi-Fi AP include Wi-Fi data frames and Wi-Fi control frames.

14. The STA of claim 13, wherein messages indicating the presence of a Wi-Fi AP include Wi-Fi management frames that are not Wi-Fi probe requests.

15. The STA of claim 13, wherein messages indicating the presence of a Wi-Fi AP exclude probe request messages transmitted by mobile stations.

16. The STA of claim 13, wherein messages indicating the presence of a Wi-Fi AP exclude messages transmitted by stations operating in an independent basic service set (IBSS) mode.

17. The STA of claim 13, wherein messages indicating the presence of a Wi-Fi AP exclude device-to-device (D2D) messages.

18. The STA of claim 11, wherein the instructions to detect at least some channel activity prior to expiration of the MinChannelTime include instructions to:
detect a physical channel clear channel assessment (PHY-CCA) indication (busy) primitive prior to the probe timer reaching the MinChannelTime.

19. A method for actively scanning a Wi-Fi network, the method comprising:
sending, by a station (STA), a probe request over a channel in a multi-channel wireless local area network (WLAN);
starting a probe timer;
detecting a physical channel clear channel assessment indication (PHY-CCA.indication) (busy) primitive before the probe timer reaches a minimal channel time (MinChannelTime);
setting a network allocation vector (NAV) to zero and scanning a next channel in the multi-channel WLAN if all frames detected before the probe timer reaches a medium channel time (MedChannelTime) are probe request frames; and
monitoring the channel for probe response messages until the probe timer reaches a maximum channel time (MaxChannelTime) if at least one frame that is not a probe request frame is detected before the probe timer reaches the MedChannelTime, wherein the MedChannelTime is in-between the MinChannelTime and the MaxChannelTime.

20. The method of claim 19, further comprising:
processing all received probe responses when the probe timer reaches the MaxChannelTime.

21. The method of claim 19, wherein the MedChannelTime is longer than or equal to the MinChannelTime but shorter than the MaxChannelTime.

* * * * *